United States Patent [19]

Targa Pascual

[11] Patent Number: 4,785,788
[45] Date of Patent: Nov. 22, 1988

[54] SUPERCHARGER SYSTEM FOR USE WITH HEAT ENGINES

[76] Inventor: Juan Targa Pascual, Benet Mercade, 17, Barcelona, Spain

[21] Appl. No.: 51,932

[22] Filed: May 19, 1987

Related U.S. Application Data

[62] Division of Ser. No. 736,797, May 22, 1985, Pat. No. 4,688,383.

[30] Foreign Application Priority Data

Jun. 4, 1984 [ES] Spain ................................. 533434
Jun. 4, 1984 [ES] Spain ................................. 533435

[51] Int. Cl.$^4$ ........................................ F02B 37/00
[52] U.S. Cl. ................................. 123/563; 60/599; 65/141; 65/151; 65/160
[58] Field of Search .................. 60/599; 123/563; 165/141, 151, 160

[56] References Cited

U.S. PATENT DOCUMENTS

| 1,798,330 | 3/1931 | Leek | 165/141 |
| 2,292,233 | 8/1942 | Lysholm | 123/559 R |
| 2,332,336 | 10/1943 | Norris | 165/141 |
| 2,748,562 | 6/1956 | Kauffmann | 60/599 |
| 2,803,440 | 8/1957 | Simpelaar | 165/160 |
| 3,144,749 | 8/1964 | Miller | |

FOREIGN PATENT DOCUMENTS

| 46016 | 3/1982 | Japan | 60/599 |
| 83/00004 | 7/1983 | PCT Int'l Appl. | |
| 1153655 | 5/1969 | United Kingdom | |

Primary Examiner—Douglas Hart
Attorney, Agent, or Firm—Brumbaugh, Graves, Donohue & Raymond

[57] ABSTRACT

A three-fluid heat exchanger cools the compressed air from the supercharger by engine-cooling water and air in a radiator with coaxial-tube bundles.

4 Claims, 4 Drawing Sheets

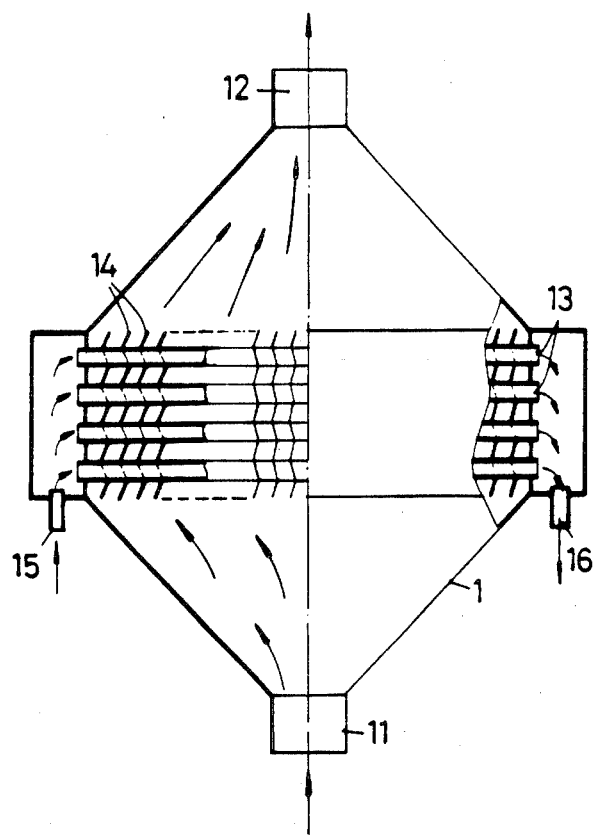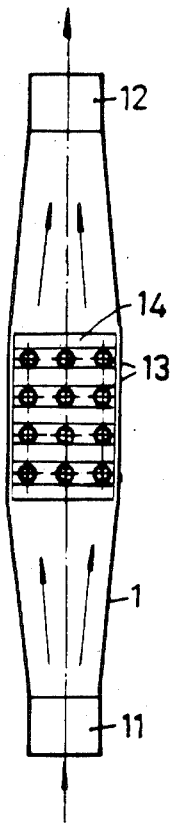

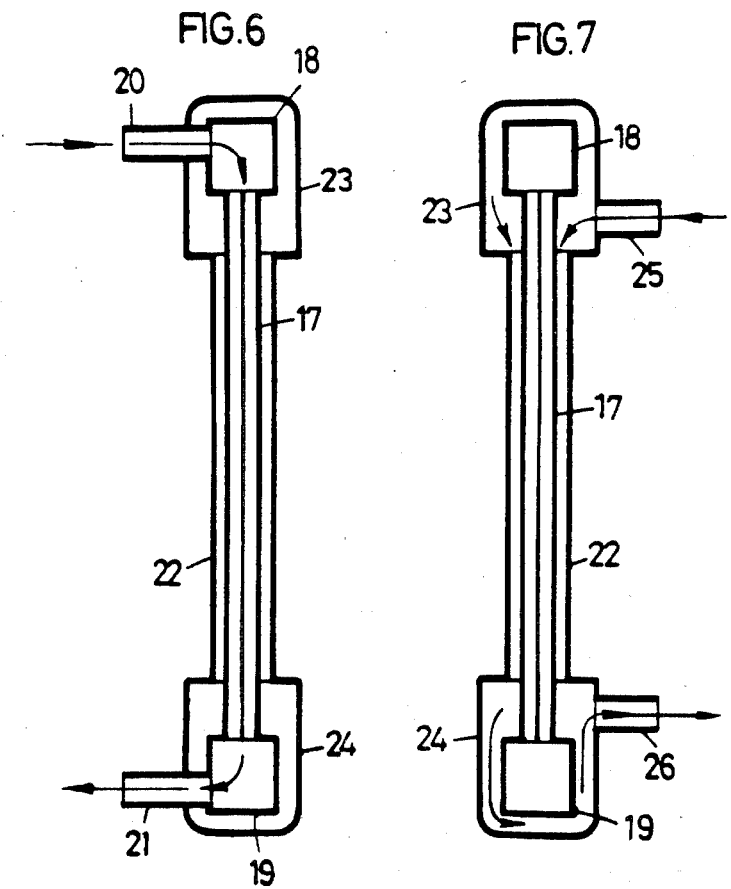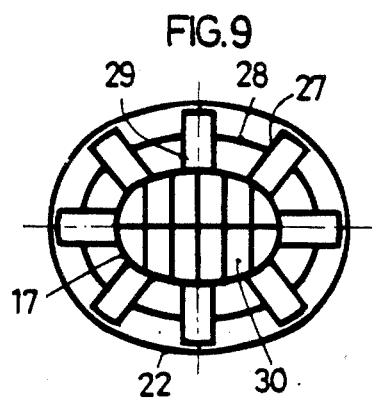

SUPERCHARGER SYSTEM FOR USE WITH HEAT ENGINES

This application is a division of application Ser. No. 736,797, filed on May 22, 1985, now U.S. Pat. No. 4,688,383.

This Patent refers to a supercharger system for use with Heat Engines by means of which a considerable increase in power is obtained for a given engine, essentially under the control of the operator.

As is already known, the supercharging of engines consists of increasing the inlet pressure to the cylinders so as to obtain an improved charge to the cylinder and hence a higher effective pressure, resulting in an increase of power for the same speed, and this, by raising the inlet manifold pressure by means of a compressor. The compressors generally used may be turbocompressors in which the rotary compressor is driven by a turbine using the engine exhaust gases, or alternatively, a volumetric system in which the action of compressing the air or the fuel mixture is produced by means of a pumping or impulsion operation of the said air or mixture into the inlet manifold.

In any event the compressing of the air or the mixture raises the temperature of the gas and results in a lessening of the weight of the gaseous fluid entering the engine. The object of this Patent is a system designed to obviate this detriment, thus allowing a notable decrease in the quantity of air or mixture admitted to the engine and hence an increase of similar proportions in the developed output power of the engine.

Essentially the system which is the object of this Patent involves the combining of a heat exchanger of an air/liquid type, a refrigerant circulating pump, a radiator for the transfer of heat between the air and the refrigerant liquid, together with other ancilliary components including an expansion chamber. The admission gas/liquid heat exchanger provides a reduction in the temperature of the compressed air or gases by passing the gas which has to be cooled between a multiplicity of finned tubes through which the coolant water is circulating, the water being pumped under the control of the compressor pressure, such that its start-up or shut-down is governed by values determined by the inlet pressure of the engine, preferably by means of a time delay which causes a time-phase interval between the control pressure and the precise instant of actuation of the pump. The system is completed with the addition of an air/water radiator for the dissipation into the atmosphere of the heat in the refrigerant coming from the first heat exchanger.

The cooling effect at this air/water radiator is produced by means of an electric fan, similarly controlled.

The heat transfer between the inlet gases and the water is obtained by means of a series of concentric tubes, the water flowing through one set of tubes and the air through tubes envelopping the former, there being separate manifolds at the inlet and outlet for each of the two fluids.

To provide a better understanding of the specification, the attached drawings illustrate one embodiment of the invention.

FIGS. 3 and 4 are cross-sections of the heat exchanger between the gaseous phase and the liquid phase.

FIG. 6 is a cross-section on the plane VI—VI of FIG. 5.

FIG. 7 is a side elevation corresponding to the previous figures.

FIG. 9 is a detail in cross-section on the plane IX—IX of FIG. 5.

Figure 1:
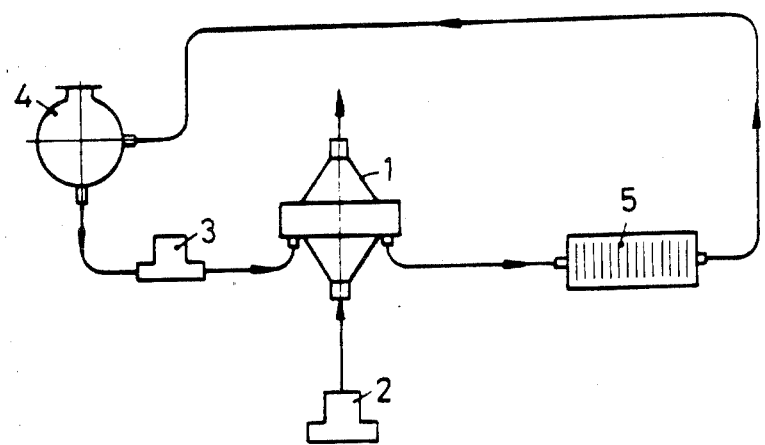
FIGS. 1 and 2 are typical diagrams of the components relevant to this invention.

As may be seen in FIG. 1, the system which is the object of this Patent comprises fundamentally a heat exchanger 1, between the gaseous fluid being supplied to the engine and water, the gas arriving from a turbocompressor or volumetric compressor 2, the water being the coolant in a refrigerant circuit which includes a pump 3, an expansion chamber 4 and an air/water radiator 5.

The water pump is controlled under the influence of the compressor pressure with a time-delay effect causing a small time de-phasing between the operation of the said pump and the instant of attaining the control pressure. This interval may be of the order of some 30 seconds.

The radiator 5 is cooled by means of an electric fan which can equally be suitably controlled from an automatic or an external manual actuator.

Figure 2:
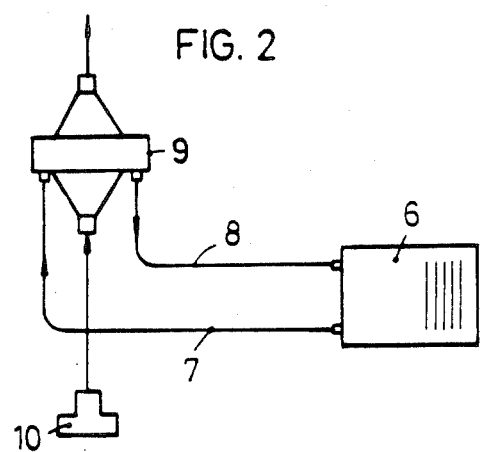
Figure 5:
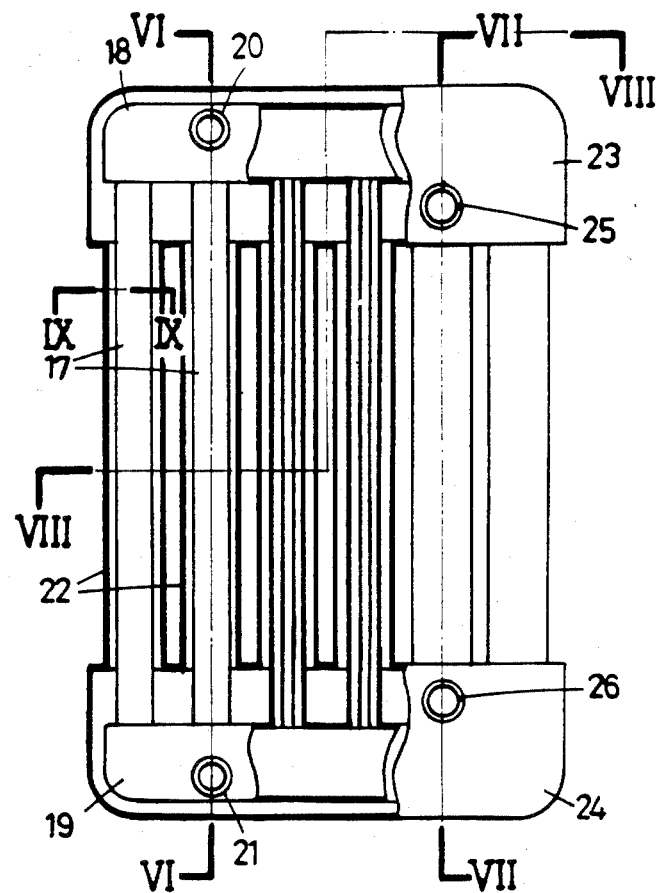
FIG. 5 shows an elevation with a partial cut-away section of a gas cooler as incorporated in these improvements.
Figure 8:
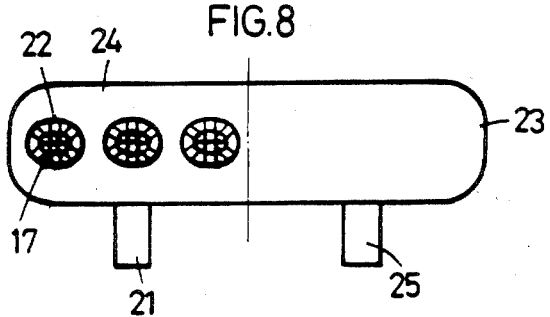
FIG. 8 is a cross-section on the plane VIII—VIII of FIG. 5.

As may be seen in FIG. 2, the gas to liquid heat transfer may be provided by incorporating the gas/liquid heat exchanger in a cooling circuit with a refrigerator 6 connected by tubing 7 and 8 to the heat exchanger 9, which in turn is fed by the turbo or volumetric compressor 10 as shown in the diagram.

In accordance with this invention, as may be seen in FIGS. 3 and 4, the heat exchanger 1 consists of a casing provided with an inlet port 11 and an outlet port 12 for the gaseous fluid, be it a fuel mixture or simply air in its passage to the engine cylinders, and complementing this, a series of internal tubes forming a bundle 13, with fins 14, through which passes a coolant liquid coming from a circuit which includes entry and exit ports 15 and 16. One characteristic of this heat exchanger is the ample divergence or angle formed between the casing connecting the inlet and outlet ports 11 and 12 and the space occupied by the tubes 13, with a resulting reduction in losses to the charge.

Referring to FIGS. 5-9 present improvements are shown to the structure of the transfer of heat between the fluid charge to the motor and the cooling circuit water by means of an arrangement of internal tube bundles 17 which are mutually parallel and which connect to an upper chamber 18 and a lower chamber 19 and in which are provided respectively entry ports 20 and outlet ports 21 for the refrigerant fluid which normally would be water, these same tubes and chambers being enveloped by another series of tubes in bundles 22 which encase externally the tubes 17 and other upper and lower chambers 23 and 24 which encase the chambers 18 and 19. Entry and exit ports 25 and 26 complete the engine charge gas circuit, the gases circulating on the outside of the space occupied by the internal coolant fluid, this in the case mentioned above, being water.

This arrangement allows for the passage of a second refrigerant fluid, preferably air, which flows on the outside of the tubes 22 and the chambers 23 and 24, producing the double cooling effect, an object of these present improvements.

For preference the flow of the internal and the external refrigerant fluids should be co-axial, as may be seen, with the external fluid flow, air, being transversal.

To improve the calorific interchange and to save space occupied by the tubes, they are provided in an oval form shown in FIG. 9 in transverse section the inner tubes having a castellated bent structure with folds 27 that protrude at a virtual right angle and then extend radially between the surface of tube 17 and surface 28 of tube 22.

Also in order to allow a better heat transfer in the inner tube, it is provided with a multiplicity of interior radial fins 29 which extend within the tube to provide an ideally radial space 30. All matters not altering, modifying or affecting the essence of the above described system will be variable insofar as this Patent is concerned.

What is claimed is:

1. A supercharger system for use with a heat engine, comprising: a first heat exchanger having a gaseous phase and a refrigerant liquid phase, said gaseous phase being provided so as to supply the engine from a supercharger compressor, and said refrigerant liquid phase being provided so as to cool said gaseous phase and eliminate excessive heat generated by the supercharger compressor; a refrigeration unit for providing refrigerant liquid to said first heat exchanger; a piping system provided so as to connect said refrigeration unit to said first heat exchanger; an independent refrigerant liquid pump for providing liquid flow; means controlling said pump as a function of supercharger pressure and having a time delay for providing a functional dephasing; a second heat exchanger for heat exchange between said refrigerant liquid phase of said first heat exchanger and surrounding air; and an expansion chamber for said refrigerant liquid phase.

2. A supercharger system as defined in claim 1; and further comprising gas circulation circuit means for feeding gases to the engine, said circuit means including upper and lower header manifolds having inlet and outlet ports for the gases, and a set of multiple mutually parallel tubes joined to said upper and lower header manifolds; and liquid circuit means providing circulation of said refrigerant liquid phase and having a construction similar to the gas circuit means, the liquid circuit means having a set of parallel tubes the outer surfaces of which, along with the outer surfaces of the set of tubes of the gas circuit, act as recipient for the action of the gaseous refrigerant, which flows transversely with respect to flow of said liquid in said tubes.

3. A supercharger system as defined in claim 2, wherein said liquid circulation tubes are folded radially so as to form multiple longitudinal protrusions between an internal surface of said tubes and the surface of the external tubes so as to provide a castellated structure which increases transfer surface area between the gases and the refrigerant liquid phase.

4. A supercharger system as defined in claim 2, wherein the tubes for said gas circulation circuit have internal radial fins provided so as to increase heat transfer area.

* * * * *